(12) United States Patent
Sheng et al.

(10) Patent No.: US 9,117,100 B2
(45) Date of Patent: Aug. 25, 2015

(54) DYNAMIC LEARNING FOR OBJECT TRACKING

(71) Applicant: QUALCOMM Incorporated, San Diego, CA (US)

(72) Inventors: Tao Sheng, Richmond Hill (CA); Alwyn Dos Remedios, Vaughan (CA)

(73) Assignee: QUALCOMM INCORPORATED, San Diego, CA (US)

( * ) Notice: Subject to any disclaimer, the term of this patent is extended or adjusted under 35 U.S.C. 154(b) by 61 days.

(21) Appl. No.: 14/023,883

(22) Filed: Sep. 11, 2013

(65) Prior Publication Data

US 2015/0071487 A1    Mar. 12, 2015

(51) Int. Cl.
| | |
|---|---|
| *G06K 9/00* | (2006.01) |
| *G06K 9/62* | (2006.01) |
| *G06F 17/30* | (2006.01) |
| *G06T 7/20* | (2006.01) |

(52) U.S. Cl.
CPC ...... *G06K 9/00013* (2013.01); *G06F 17/30244* (2013.01); *G06K 9/627* (2013.01); *G06K 9/6282* (2013.01); *G06T 7/2033* (2013.01)

(58) Field of Classification Search
USPC .......................................... 382/103, 124–127
See application file for complete search history.

(56) References Cited

U.S. PATENT DOCUMENTS

| | | | | |
|---|---|---|---|---|
| 5,177,802 | A * | 1/1993 | Fujimoto et al. | 382/124 |
| 5,420,937 | A * | 5/1995 | Davis | 382/125 |
| 5,907,633 | A | 5/1999 | Fromenteau et al. | |
| 6,122,395 | A * | 9/2000 | Yamaguchi et al. | 382/125 |
| 7,151,846 | B1 * | 12/2006 | Fujii | 382/125 |
| 7,587,072 | B2 * | 9/2009 | Russo et al. | 382/124 |
| 7,885,432 | B2 * | 2/2011 | Tsubata | 382/115 |
| 8,059,102 | B2 | 11/2011 | Rimon et al. | |
| 8,243,041 | B2 | 8/2012 | Westerman | |
| 2004/0017934 | A1 * | 1/2004 | Kocher | 382/125 |
| 2004/0052407 | A1 * | 3/2004 | Kawabe | 382/124 |

(Continued)

FOREIGN PATENT DOCUMENTS

EP            1980994 A1    10/2008

OTHER PUBLICATIONS

Gui V., et al., "Finger Detection in Video Sequences Using a New Sparse Representation", ACTA Technica Napocensis, vol. 52, No. 1, Jan. 1, 2011, 6 pages.

(Continued)

*Primary Examiner* — Alex Liew
(74) *Attorney, Agent, or Firm* — Kilpatrick Townsend & Stockton LLP

(57) ABSTRACT

Techniques described herein relate to mobile computing device technologies, such as systems, methods, apparatuses, and computer-readable media for tracking an object from a plurality of objects. In one aspect, the plurality of objects may be similar. Techniques discussed herein propose dynamically learning information associated with each of the objects and discriminating between objects based on their differentiating features. In one implementation, this may be done by maintaining a database associated with each object and updating the dynamic database transferred while the objects are tracked. The tracker uses algorithmic means for differentiating objects by focusing on the differences amongst the objects. For example, in one implementation, the method may weigh the differences between different fingers higher than their associated similarities to facilitate differentiating the fingers.

38 Claims, 9 Drawing Sheets

(56) References Cited

U.S. PATENT DOCUMENTS

| | | | |
|---|---|---|---|
| 2004/0071347 A1* | 4/2004 | Kaplan | 382/217 |
| 2004/0184642 A1* | 9/2004 | Miyasaka | 382/124 |
| 2007/0291994 A1* | 12/2007 | Kelle et al. | 382/110 |
| 2008/0042979 A1 | 2/2008 | Nikbin | |
| 2008/0187175 A1* | 8/2008 | Kim et al. | 382/103 |
| 2011/0115604 A1 | 5/2011 | Sobel et al. | |

OTHER PUBLICATIONS

International Search Report and Written Opinion—PCT/US2014/054828—ISA/EPO—Jan. 13, 2015.

Kalal Z., et al., "Tracking-Learning-Detection", IEEE Transactions on Pattern Analysis and Machine Intelligence, vol. 34, No. 7, Jul. 2012, pp. 1409-1422.

Kulkarni V. Y., et al., "Random Forest Classifiers :A Survey and Future Research Directions", International Journal of Advanced Computing, vol. 36, Issue 1, Apr. 2013, pp. 1144-1153.

Malik S., et al., "Interacting with Large Displays from a Distance withVision-Tracked Multi-Finger Gestural Input", UIST 05, Proceedings of the 18th, Annual ACM Symposium on User Interface Software and Technology, Oct. 23, 2005, pp. 43-52.

Meng-Yuan S., et al., "Multi Gesture Recognition: A Tracking Learning Detection Approach", Li Xue Xueliiotatee UQ Edu AU The University of Queensland School of Information Technology and Electronic Eng, Lecture Notes in Computer Science; [Lecture Notes in Computer Science], Springer Verlag, DE, XP047201028, ISSN: 0302-9743, Jul. 31, 2013, pp. 714-721.

Pugeault N., et al., "Spelling it out: Real-time ASL fingerspelling recognition", 2011 IEEE International Conference on Computer Vision Workshops, Nov. 6, 2001, pp. 1114-1119.

Saffari A., et al., "On-line Random Forests", 2009 IEEE 12th International Conference on Computer Vision Workshops, Sep. 27, 2009, pp. 1393-1400.

Santer J., et al., "PROST: Parallel Robust Online Simple Tracking," 2010 IEEE Conference on Computer Vision and Pattern Recognition, Jun. 13, 2010), pp. 723-730.

Wang A., et al., "An Incremental Extremely Random Forest Classifier for Online Learning and Tracking", 16th IEEE International Conference on Image Processing, Nov. 2009, pp. 1449-1452.

* cited by examiner

DYNAMIC LEARNING FOR OBJECT TRACKING

BACKGROUND

Aspects of the disclosure relate to computing technologies. In particular, aspects of the disclosure relate to mobile computing device technologies, such as systems, methods, apparatuses, and computer-readable media for tracking objects.

With increasing prevalence of mobile devices in every day operations, future generation of applications will involve identifying and tracking objects. In some instances, it may be desirable to track an object amongst other similar objects. For example, some applications may track a finger from a plurality of fingers. Current techniques for tracking one or more fingers fail to differentiate one finger from another and are also very computationally intensive. Current techniques focus on the features of the finger itself in isolation for the purposes of tracking fingers. Any two fingers (especially from the same person) have more in common than not. Therefore, most algorithms using probabilistic techniques of tracking or matching a finger to a stored/cached image lead to false positives. Other techniques that use relative positioning of fingers are also not very effective for small appliances that have a very small field of view and may not have visibility to significant portions of the hand to continue to track the fingers using relative information associated with the fingers.

BRIEF SUMMARY

According to one or more aspects of the disclosure, techniques described herein enable a mobile device to detect an object from a plurality of objects. In one embodiment, techniques describe detecting a plurality of objects from image data, tracking a difference associated with one or more features for the plurality of objects with respect to an object from the image data, and identifying the object from the plurality of objects using the tracking difference associated with the one or more features for the plurality of objects.

Techniques discussed herein propose dynamically learning information associated with each of the objects and discriminating between objects based on their differentiating features. In one implementation, this may be done by maintaining a database associated with each object and updating the dynamic database datasets transferred while the objects are tracked. The tracker uses algorithmic means for differentiating objects by focusing on the differences amongst the objects. For example, in one implementation, the method may weigh the differences between different fingers higher than their associated similarities to facilitate differentiating the fingers.

An example method for tracking an object may include detecting a plurality of objects from image data, wherein the plurality of objects comprises a first object, tracking a difference associated with one or more features for the plurality of objects with respect to the first object from the image data and identifying the first object from the plurality of objects using the tracking difference associated with the one or more features for the plurality of objects. In one embodiment, tracking the difference associated with the one or more features for the plurality of objects may include dynamically learning and storing information about the difference of the one or more features associated with one or more of the plurality of objects. The dynamically learned information may be maintained in a dynamic decision forest learning dataset associated with each detected object.

In one embodiment of the above example method, the first object from the plurality of objects may include weighing the difference associated with the one or more features amongst the plurality of objects higher than similarities associated with the one or more features amongst the plurality of objects. In one embodiment, tracking the difference associated with the one or more features may include identifying the one or more features for each object from the plurality of objects, and determining the difference associated with the one or more features between the first object and the remaining one or more objects. The one or more features for each object may be tracked using an instance of a tracker and wherein the difference associated with the one or more features between the first object and the remaining one or more objects is determined by sharing information between the instances of trackers associated with each object.

In one implementation of the method, the plurality of objects are fingers and tracking the object includes tracking the first object. In certain embodiments, the plurality of objects are substantially similar to each other.

In some implementations of the method, the first object is labeled as a positive object and the remaining one or more objects are labeled as negative objects. Furthermore, in one aspect differentiating the first object from at least one of the remaining one or more objects comprises using the difference in an at least one feature from the one or more features associated with the positive object and the at least one of the remaining one or more objects labeled as negative objects in differentiating the first object from the at least one of the remaining one or more objects.

In certain embodiments of the method, detecting the plurality of objects may also include determining the first object from the plurality of objects. In some implementations, identifying the first object may include identifying the first object using trajectory information associated with a movement of the first object. Identifying the first object may further include identifying the first object using the difference between the trajectory information associated with the movement of the first object and at least one of the remaining one or more objects. In yet another embodiment, identifying the first object may include identifying the first object using the difference between the trajectory information associated with the movement of the first object and at least one of the remaining one or more objects.

An example computing device for tracking an object may include a camera coupled to the computing device for acquiring an image, a processor for detecting a plurality of objects from image data, wherein the plurality of objects comprises a first object, a tracking module for tracking a difference associated with one or more features for the plurality of objects with respect to the first object from the image data and the tracking module further identifying the first object from the plurality of objects using the tracking difference associated with the one or more features for the plurality of objects. In one embodiment, tracking the difference associated with the one or more features for the plurality of objects, by the tracking module, may include dynamically learning and storing information about the difference of the one or more features associated with one or more of the plurality of objects. The dynamically learned information may be maintained in a dynamic decision forest learning dataset associated with each detected object.

In one embodiment of the above example computing device, determining the first object from the plurality of objects, by the tracking module, may include weighing the difference associated with the one or more features amongst the plurality of objects higher than similarities associated with the one or more features amongst the plurality of objects. In one embodiment of the computing device, tracking the difference associated with the one or more features, by the processor may include identifying the one or more features for each object from the plurality of objects, and determining the difference associated with the one or more features between the first object and the remaining one or more objects. The one or more features for each object may be tracked using an instance of a tracker and wherein the difference associated with the one or more features between the first object and the remaining one or more objects is determined by sharing information between the instances of trackers associated with each object.

In one implementation of the computing device, the plurality of objects are fingers and tracking the object includes tracking the first object. In certain embodiments, the plurality of objects are substantially similar to each other.

In some implementations of the computing device, the first object is labeled as a positive object and the remaining one or more objects are labeled as negative objects. Furthermore, in one aspect differentiating the first object from at least one of the remaining one or more objects comprises using the difference in an at least one feature from the one or more features associated with the positive object and the at least one of the remaining one or more objects labeled as negative objects in differentiating the first object from the at least one of the remaining one or more objects.

In certain embodiments of the computing device, detecting the plurality of objects may also include determining the first object from the plurality of objects. In some implementations, identifying the first object may include identifying the first object using trajectory information associated with a movement of the first object. Identifying the first object may further include identifying the first object using the difference between the trajectory information associated with the movement of the first object and at least one of the remaining one or more objects. In yet another embodiment, identifying the first object may include identifying the first object using the difference between the trajectory information associated with the movement of the first object and at least one of the remaining one or more objects.

An example non-transitory computer readable storage medium may include instructions executable by a processor that may detect a plurality of objects from image data, wherein the plurality of objects comprises a first object, track a difference associated with one or more features for the plurality of objects with respect to the first object from the image data and identify the first object from the plurality of objects using the tracking difference associated with the one or more features for the plurality of objects. In one embodiment, tracking the difference associated with the one or more features for the plurality of objects may include instructions for dynamically learning and storing information about the difference of the one or more features associated with one or more of the plurality of objects. The dynamically learned information may be maintained in a dynamic decision forest learning dataset associated with each detected object.

In one embodiment of the above example non-transitory computer readable storage medium, the first object from the plurality of objects may include weighing the difference associated with the one or more features amongst the plurality of objects higher than similarities associated with the one or more features amongst the plurality of objects. In one embodiment of the non-transitory computer readable storage medium, tracking the difference associated with the one or more features may include identifying the one or more features for each object from the plurality of objects, and determining the difference associated with the one or more features between the first object and the remaining one or more objects. The one or more features for each object may be tracked using an instance of a tracker and wherein the difference associated with the one or more features between the first object and the remaining one or more objects is determined by sharing information between the instances of trackers associated with each object.

In one implementation, the plurality of objects are fingers and tracking the object includes tracking the first object. In certain embodiments, the plurality of objects are substantially similar to each other.

In some implementations of the non-transitory computer readable storage medium, the first object is labeled as a positive object and the remaining one or more objects are labeled as negative objects by the instructions. Furthermore, in one aspect, differentiating the first object from at least one of the remaining one or more objects may include instructions for using the difference in an at least one feature from the one or more features associated with the positive object and the at least one of the remaining one or more objects labeled as negative objects in differentiating the first object from the at least one of the remaining one or more objects.

In certain embodiments of the non-transitory computer readable storage medium, detecting the plurality of objects may also include determining the first object from the plurality of objects. In some implementations, identifying the first object may include identifying the first object using trajectory information associated with a movement of the first object. Identifying the first object may further include identifying the first object using the difference between the trajectory information associated with the movement of the first object and at least one of the remaining one or more objects. In yet another embodiment, identifying the first object may include identifying the first object using the difference between the trajectory information associated with the movement of the first object and at least one of the remaining one or more objects.

An example apparatus for tracking an object may include means for detecting a plurality of objects from image data, wherein the plurality of objects comprises a first object, means for tracking a difference associated with one or more features for the plurality of objects with respect to the first object from the image data and means for identifying the first object from the plurality of objects using the tracking difference associated with the one or more features for the plurality of objects. In one embodiment, means for tracking the difference associated with the one or more features for the plurality of objects may include dynamically learning and means for storing information about the difference of the one or more features associated with one or more of the plurality of objects. The dynamically learned information may be maintained in a dynamic decision forest learning dataset associated with each detected object.

In one embodiment of the above example apparatus, the first object from the plurality of objects may include means for weighing the difference associated with the one or more features amongst the plurality of objects higher than similarities associated with the one or more features amongst the plurality of objects. In one embodiment, tracking the difference associated with the one or more features may include means for identifying the one or more features for each object from the plurality of objects, and means for determining the difference associated with the one or more features between the first object and the remaining one or more objects. The one or more features for each object may be tracked using an instance of a tracker and wherein the difference associated with the one or more features between the first object and the remaining one or more objects is determined by sharing information between the instances of trackers associated with each object.

In one implementation, the plurality of objects are fingers and tracking the object includes tracking the first object. In certain embodiments, the plurality of objects are substantially similar to each other.

In some implementations of the apparatus, the first object is labeled as a positive object and the remaining one or more objects are labeled as negative objects. Furthermore, in one aspect means for differentiating the first object from at least one of the remaining one or more objects comprises using the difference in an at least one feature from the one or more features associated with the positive object and the at least one of the remaining one or more objects labeled as negative objects in differentiating the first object from the at least one of the remaining one or more objects.

In certain embodiments, means for detecting the plurality of objects may also include determining the first object from the plurality of objects. In some implementations, means for identifying the first object may include identifying the first object using trajectory information associated with a movement of the first object. Means for Identifying the first object may also further include means for identifying the first object using the difference between the trajectory information associated with the movement of the first object and at least one of the remaining one or more objects. In yet another embodiment, means for identifying the first object may include means for identifying the first object using the difference between the trajectory information associated with the movement of the first object and at least one of the remaining one or more objects.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be feature of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 8:
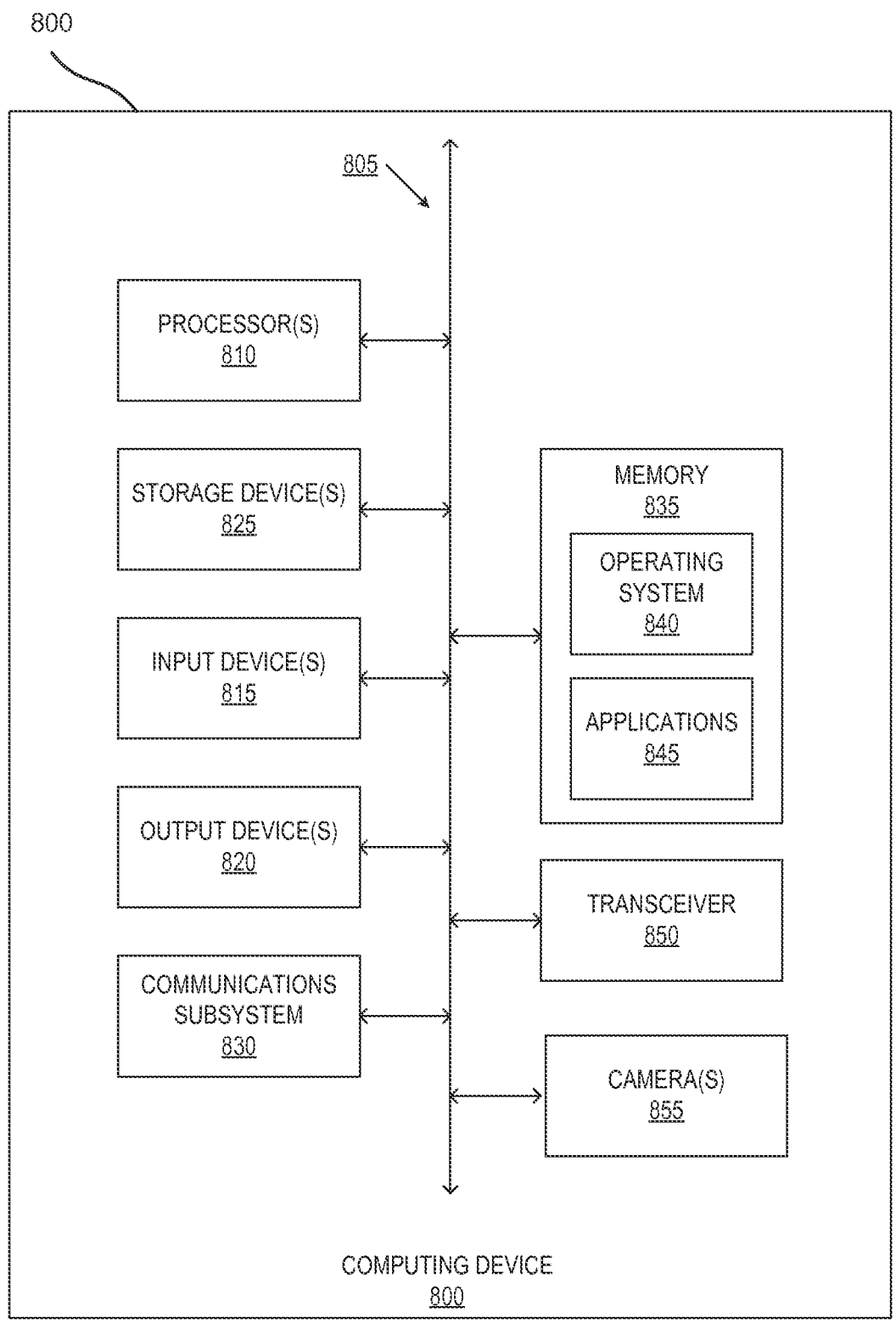
FIG. 8 illustrates an example computing device incorporating parts of the device employed in practicing embodiments of the invention.

As discussed herein, a "mobile device" may comprise any electronic device that may be transported and operated by a user. Examples of mobile devices include mobile phones (e.g. cellular phones), PDAs, tablet computers, net books, laptop computers, personal music players, hand-held specialized readers, etc. FIG. 8 provides an example system with one or more components that may be used in implementing a mobile device.

Prior art techniques for tracking an object from a plurality of similar objects are very computationally intensive and error prone. Many current techniques focus on the features of the object of interest itself in isolation for the purposes of tracking the object. Computer vision generally works on the principle of probabilistic matching of an object against a reference image of the object. Usually, the prior art algorithms determine a positive match for an object from the field of view when a detected object is more likely to be a match with the reference image than not. When a second object with similar features, but not the same features is presented in the field of view of the camera, prior art techniques may still detect a positive match for the second object, since probabilistically the image of the second object may still be very similar to the reference object for the first object. Furthermore, when multiple similar objects with similar features are presented simultaneously in the field of view of the camera, prior art techniques may be easily confused and incapable of accurately tracking the object.

For example, tracking fingers in the field of view of a camera accurately is difficult. Any two fingers (especially from the same person) have more in common than not. Therefore, most algorithms using probabilistic techniques for identifying a finger from a group of fingers by tracking or matching a finger to a stored/cached reference image lead to false positive matches by confusing one finger for the other. Other techniques that use relative positioning of fingers as part of a hand are also not very effective for small appliances that have a very small field of view and may not have visibility to significant portions of the hand to continue to track the fingers using relative information associated with the fingers.

Furthermore, many prior art systems may also become confused if a first finger (such as the index finger) is moved away from the field of view and replaced with a second finger (such as the middle finger). Prior art techniques may mistakenly identify the middle finger as the index finger, since the middle finger may still probabilistically be similar enough to the reference image of the index finger. Also, in many prior art systems if a finger is moved away from the field of view the system may lose the ability to continue to track the finger and may need to reinitiate the detection process before continuing to track the finger the next time the finger is detected.

These problems result in very limited use of finger-based gesture control and results in poor user experience due to the false positive finger tracking. There is a need to differentiate the fingers for multiple finger tracking to achieve richer and more accurate human-computer interaction. Similar problems exist in identifying any object from a group of similar objects. Although, some problems and embodiments are described in terms of fingers, the same techniques may be applied to any object that is to be tracked amongst similar objects. For example, most current systems may not be able to properly differentiate soccer ball from a basketball.

Instead of solely relying on differentiating the objects through very complicated features for each object, the system dynamically learns information associated with each of the objects and discriminates between objects based on their differentiating features. In one implementation, this may be done by maintaining a database, such as a dynamic decision forest learning dataset associated with each object and updating the dynamic decision forest learning datasets while the objects are tracked. In one implementation, an interactive decision forest learning (IDFL) database is used. The object that is the focus of tracking may be labeled as the positive object, and the other objects that are not the main focus of the tracking may be labeled as negatives. Dynamic decision forest learning datasets are maintained for the positive and negative objects during the tracking process. Furthermore, each object may have a positive and negative database associated with the object. The tracker uses algorithmic means for differentiating the positive object from the negative objects by focusing on the differences amongst the decision forests for the positive and negative objects. For example, in one implementation, the method may weigh the differences between the different decision forests learning datasets associated with the different fingers higher than their associated similarities to facilitate differentiating the fingers.

Figure 1A:
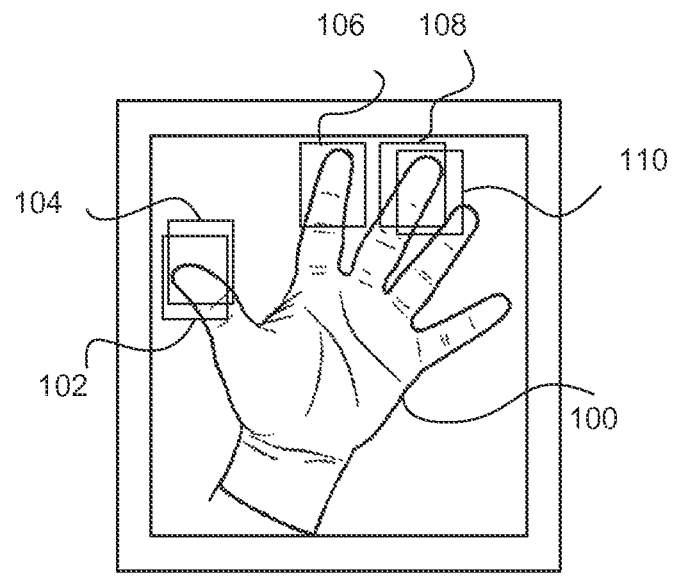
FIG. 1A illustrates tracking fingers of a user hand using a prior art system.

FIG. 1A illustrates tracking fingers of a user hand 100 using a prior art system. In FIG. 1A, five independent instantiations of the tracker are instantiated for tracking each finger of the user. In FIG. 1A, each tracker is represented by a rectangular box (102, 104, 106, 108, and 110). As shown in the FIG. 1A, by multiple boxes around the same fingers, prior art algorithms confuse similar objects, such as fingers, with each other. For example, in FIG. 1A, instead of each of the five trackers properly tracking each of the five fingers, rectangular boxes 102 and 104 are shown tracking the thumb, whereas rectangular boxes 108 and 110 are shown tracking the middle finger, leaving out two fingers from the five fingers.

Figure 1B:
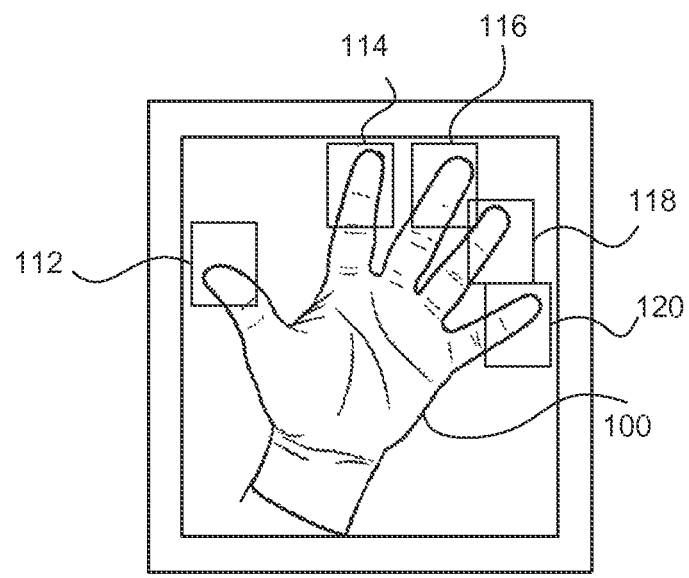
FIG. 1B illustrates tracking fingers of a user hand using embodiments disclosed in this application.

FIG. 1B illustrates tracking fingers of a user hand 100 using embodiments described herein. In FIG. 1B, five instantiations of the tracker are instantiated for tracking each finger of the user. In FIG. 1B, each instantiation of the tracker is represented by a rectangular box or bounding box (112, 114, 116, 118, and 120). As described in further detail with respect to the subsequent figures, each instantiation of the tracker may dynamically learn information associated with the other fingers to emphasize the differences between the fingers in determining and appropriately tracking each fingertip. As shown in FIG. 1B, using embodiments described herein, each finger is appropriately differentiated from the other. Each rectangular box or bounding box is shown appropriately tracking one of the five fingers.

A bounding box may be understood to be information describing a continuous or relatively continuous body of pixels within a frame. In some implementations, a bounding box may be rectangular, but other shapes may also be used in accordance with this disclosure. The bounding box may be understood as representing an algorithmic determination that an image of the tracked object is included in the body of pixels described by the bounding box.

Figure 2:
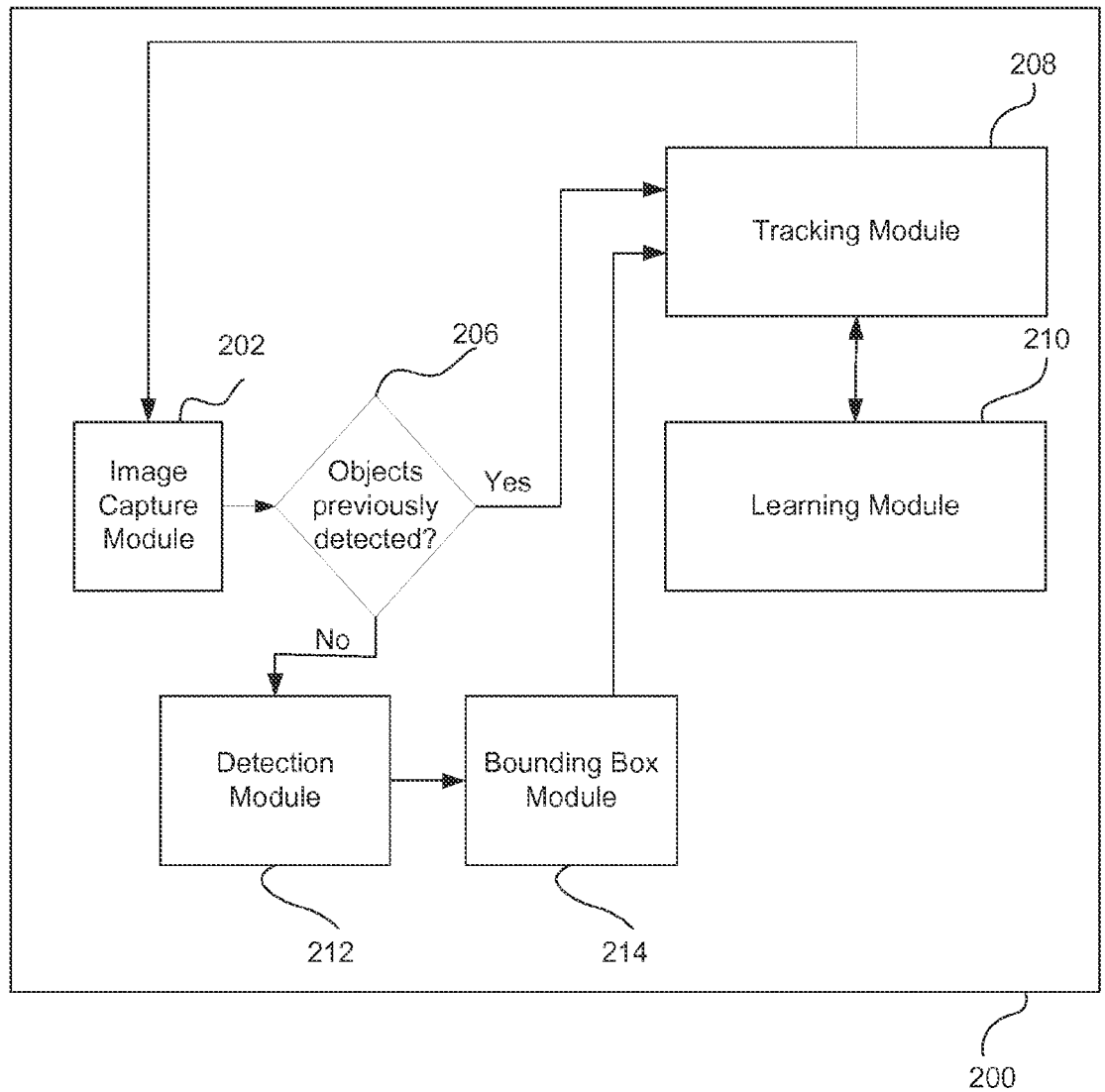
FIG. 2 illustrates a block diagram with an example tracking system for performing embodiments of the disclosure.

FIG. 2 depicts a block diagram, showing example components for performing methods provided by embodiments of the disclosure for implementing a tracking system 200. Computer device 800 discussed with reference to FIG. 8 below, may represent some of the components of a mobile device used for performing the embodiments of the invention described in FIG. 2. The components and modules discussed in FIG. 2 may be implemented in hardware, software, firmware or any combination thereof. Components implemented in software and firmware may be implemented using a non-transitory computer-readable medium.

At block 202, components of the computing device 800, such as an Image Capture Module 202 may acquire the image for further processing. In one implementation, the Image Capture Module 202 may use one or more cameras 855 for acquiring images. The acquired image may be stored in memory 835 for further processing.

At block 206, components of the computing device 800 may determine if objects in the captured image has been previously determined. For example, if the Image Capture Module 202 is acquiring images from the same scene with the same objects continuously, the objects from the captured image may have been previously detected and do not need to go through the detection Module 212 for detection. Instead, they may be continually tracked at the Tracking Module 208, according to embodiments of the invention.

Accordingly, if the tracking system 200 determines at block 206 that the objects in the image have been previously detected, then the control may be transitioned to the Tracking Module 208. The Tracking Module 208 leverages information from the Learning Module 210 in tracking the objects of interest placed amongst similar objects in the same or different frames. For example, the Tracking Module 208, in one implementation, uses the information associated with other similar objects from the frame to emphasize the differences between the objects in determining and appropriately tracking the object of interest. As part of continually tracking the object, the tracking system 200 may return back to acquiring more images at the Image Capture Module 202.

As described herein, the Learning Module 210 dynamically learns information about the objects of interest and maintains the information in the database. The Learning Module facilitates the tracking system 200 in disambiguating the objects from each other. Various objects from the frames may each have an associated database. However, in some implementations each of these databases associated with an object may be stored as a sub-database, dataset or a record within a larger database. The Learning Module 210 dynamically learns and shares learned information regarding the various similar objects with the Tracking Module 208 for facilitating the tracking function of the Tracking Module 208. As an alternative to the acquisition of the initial frames and the building of the initial dataset, the databases may be encoded or provided with an initial data set. In this case, the tracking system 200 may use the initial frames that include features for the objects to refine the initial data set, or may execute subsequent processes from the Tracking Module 208, without immediately altering the initial data set.

Referring back to block 206, if the one or more objects from the captured image have not been previously detected, the Detection Module 212 may perform detection of the objects in the captured image. The object of interest may be determined based on user input and/or context or a combination thereof. For example, as programmed by the user, the computing device 800, such as a mobile device may expect a movement by the index finger of the user in a specific manner to unlock the mobile device.

In one embodiment, the Detection Module 212 may detect objects by detecting features associated with the objects in the image acquired by the computing device 800. In one embodiment, the Detection Module 212 may facilitate initializing the databases maintained by the Learning Module 210 for the detected objects from the image. In one implementation, the Detection Module 212 may prompt the user through a user interface, such as a display device (e.g., Input 815/Output 820 device), to facilitate the detection process. For example, for populating the database associated with detecting fingers for the user, the Detection Module 212 may prompt the user to place the whole hand in the field of view of the camera 855 for a pre-determined period of time to facilitate detection of the objects. Continuing with the finger example, the Detection Module 212 may use the relative positioning of each of the fingers to determine the fingers (i.e. thumb, index finger, middle finger, etc.).

In one implementation, identifying features associated with the objects may comprise using positional and relative information of the objects with each other. For example, for identifying features of the various fingers, the Detection Module 212 may use the relative positioning of each finger with respect to each other. In other implementations, the Detection Module 212 may use a detection mode or a learning mode, where the Detection Module 212 may request the user to provide specific information or associate objects with datasets of information.

Generally, detection algorithms may be more computationally intensive and may take longer to execute than tracking algorithms. Therefore, it may be advantageous to sparingly engage the Detection Module 212 and rely on the Tracking Module 208, once enough information is available for tracking the object. At the Detection Module 212 enough initialization information for the detected frame is generated to track the object of interest and the information is used to detect the initial Bounding Boxes at the Bounding Box Module 214.

Components of the computing device 800, such as a Bounding Box Module 214 from the tracking system 200 may be configured to output bounding boxes having a shape determined in light of the typical shape or structural features of the object which the tracker is configured to track. For example, in implementations in which the tracking system 200 is designed to track a finger, the Bounding Box Module 204 may be designed to provide bounding boxes that are square, rectangular, approximately circular, or may tightly surround the image location of the fingers.

One embodiment may use bounding boxes in processing operations to represent location estimates of one or more tracked objects. The Bounding Box Module 214 may also output bounding box information for each processed frame in which an object is detected. These outputted bounding boxes may be used to determine a machine response to the tracked object. Tracking with bounding boxes may have several computational benefits. For example, the bounding boxes outputted by the Bounding Box Module 214 may be easily compared to determine the consistency between the tracking results of the two modules, and to compare the tracking results of the modules to the final bounding box (final tracking determination). When rectangular bounding boxes are used, the approximately rectangular and continuous bounding box shape may enable the amount of overlap of bounding boxes for a frame to be easily determined using minimal calculations. Moreover, the presence or absence of overlap between the various bounding boxes, as well as the amount of overlap, may provide a simple and reliable way of determining whether the tracking results are consistent and reliable, or inconsistent and unreliable. Once the objects in the image have been detected and the bounding boxes have been determined, the tracking system 200 may pass control to the Tracking Module 208 for continuing the tracking and updating of the Learning Module 210.

Some systems, contemplated by this disclosure may include optimizing the tracking system 200 by consolidating functionality from several modules into one module or by bypassing execution of functional blocks based on the executing environment. In some variations, sensors may be used to determine changes in environmental factors for determining if the Detection Module 212 may be executed. In one implementation, sensors, such as light sensors, inertial sensors or other sensors may be used to detect a sudden change in the lighting of the image frame or the positioning of the device to revert the tracking system 200 to a generalized flow.

Figure 3:
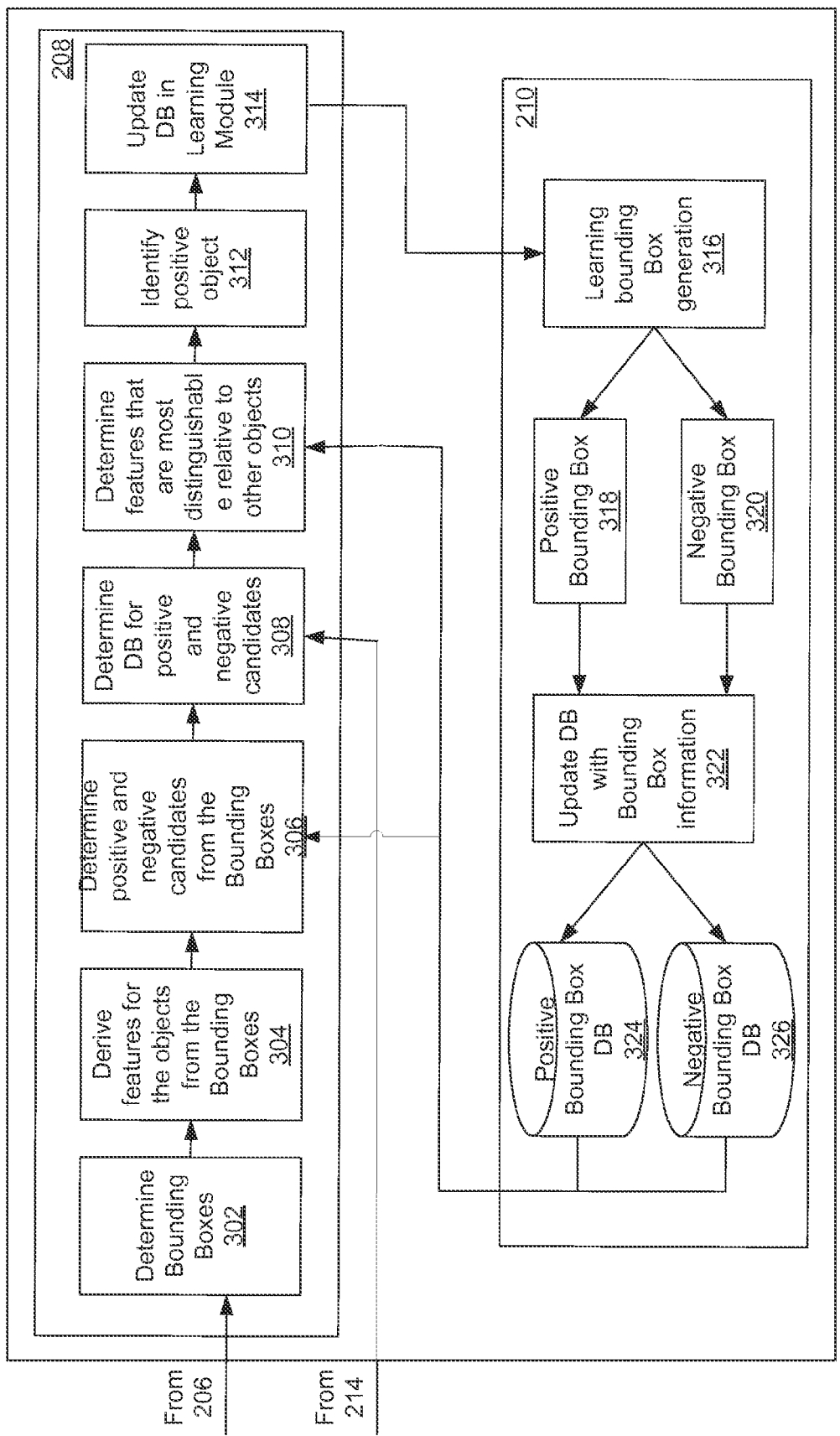
FIG. 3 describes an exemplary implementation of some of the modules described in FIG. 2.

FIG. 3 describes an exemplary implementation for some of the modules described in FIG. 2. The components and modules discussed in FIG. 3 may be implemented in hardware, software, firmware or any combination thereof. Components implemented in software and firmware may be implemented using a non-transitory computer-readable medium.

The Tracking Module 208 tracks the object of interest using information from the Learning Module 210 and also provides information to the Learning Module 210 for dynamically updating its databases with the object information. The object of interest may be determined based on the user input and/or based on the context or a combination thereof. For example, as programmed by the user, the computing device 800, such as a mobile device, may expect movement by an index finger of the user in a specific manner to unlock the mobile device.

In FIG. 2, at block 206, if the tracking system 200 determines that the one or more objects in the captured image have been detected before, the tracking system 200 may transfer control to the Tracking Module 208 at block 302. At block 302, the Tracking Module 208 determines the new bounding boxes for the objects in the images. Block 302 may use techniques similar to techniques discussed with respect to block 214 in determining the bounding boxes. At block 304, the Tracking Module 208 may derive features associated with the objects from the bounding boxes.

At block 306, the Tracking Module 208 may consult the Positive Bounding Box databases 324 and the Negative Bounding Box databases 326 from the Learning Module 210 for determining positive and negative candidates from the bounding boxes for tracking the object of interest. The Positive Bounding Box Database 324 and the Negative Bounding Box Database 326 may be maintained by the Learning Module 210, in one implementation. The Negative Bounding Box Database 326 may be a collection of databases with information regarding the other potential objects besides the positive objects. In the example of fingers, where the tracking system 200 may be actively tracking the index finger, the databases for the other fingers, besides the index fingertip, of the hand may be considered as a collection of databases and referred to as the Negative Bounding Box Database 326. In yet other implementations, a Positive and Negative Bounding Box Database may be maintained for each object separately.

In one embodiment, the Tracking Module 208, at block 306, may use the features detected at block 304 for the objects from the bounding boxes and compare them against the Positive Bounding Box Databases 324 and the Negative Bounding Box Databases 326. In some embodiments, multiple Positive 324 and Negative Bounding Box Databases 326 may exist for various objects previously detected. Based on the comparison between the features associated with the objects from the bounding boxes and the databases, the Tracking Module 208 may generate positive and negative candidate matches for the objects from the bounding boxes.

At block 308, the Tracking Module 208 may determine the Positive 324 and the Negative Bounding Box databases 326 for the potential positive and negative candidates for the objects from the bounding boxes.

At block 310, the Tracking Module 208 may retrieve information associated with the features of the positive candidates and other objects from the Positive Bounding Box Database 324 and the Negative Bounding Box Database 326. The Tracking Module 208 determines the features that are most distinguishable for the positive candidates with respect to the Positive 324 and Negative Bounding Box Databases 326 associated with other objects. In one embodiment, the Tracking Module 208 may determine features that are most distinguishable by comparing the features of the positive candidates against the Positive 324 and Negative Bounding Box databases 326 of the other objects.

At block 312, the Tracking Module 208 identifies or confirms the positive objects from one or more of the positive candidates identified at block 306. In some implementations, the Tracking Module 208 may determine that all or some of the positive candidates identified at block 306 are false positive identifications of potential candidates.

At block 314, the Tracking Module 208 may commence the process of updating the Learning Module 210 for the object being tracked. For example, in instances where at block 312 false positives are identified, the Positive 324 and Negative 326 Bounding Box databases for the object may be updated. In one implementation, the weight associated with the feature in the Positive Bounding Box Database may be increased and/or the weight associated with the feature in the Negative Bounding Box Database 326 may be decreased. This may be advantageous so that the same object or a similar object may have less probability of again being identified as a positive candidate at block 306 based on the same feature. This may result in further refining the selection of positive candidates in future iterations for the Tracking Module 208.

In a particular non-limiting example, a detected feature for the positive candidate may have a 75% probability of accurately identifying the object being tracked. However, at block 308, the Tracking Module 208 may compare the feature against features for other objects using their associated Positive 324 and Negative Bounding Box databases 326. For instance, upon comparison of the same feature with databases associated with other objects, the Tracking Module 208 may determine that the same feature has a probability of matching the feature in another Positive Bounding Box database with 85% probability. In that scenario, the Tracking Module 208 may determine that it has identified a false positive candidate, at block 306, and accordingly update the Positive 324 and Negative Bounding Box Databases 326 for the object. This may be advantageous in refining the list of positive candidate the next time the Tracking Module 208 tries to identify the positive candidates for a similar object.

As previously discussed in FIG. 2, the Learning Module 210 may be responsible for dynamically learning information regarding the various, but similar, objects of interest and maintaining the information in the Positive 324 and Negative Bounding Box Databases 326 for later use by the Tracking Module 208. In some embodiments, a Positive 324 and Negative Bounding Box Database 326 may be maintained for each object.

At block 316, after the positive object is detected by the Tracking Module 208, the tracking system 200 commences the process of dynamically learning information regarding the Boundary Boxes associated with the positive and the negative objects. The bounding box information is separated into the Positive Bounding Box (block 318) and Negative Bounding Box (block 320) information. At block 322, updates to the Bounding Box Databases is generated and stored in the Positive Bounding Box Database 324 and Negative Bounding Box Database 326. As previously discussed, the information from the Positive Bounding Box Database 324 and the Negative Bounding Box Database 326 may be used by the Tracking Module 208 in determining features associated with positive and negative objects.

In one implementation, aspects of the invention may be implemented using Interactive Decision Forest Learning (IDFL). Decision forest learning may be useful in scene recognition from photographs and object recognition in images. A decision forest may be a set of several decision trees. These trees may be formed by various methods or by different sub-samples of observations over one and the same phenomenon, by use of different features. Such many sided consideration of a problem, as a rule, gives the improvement of quality of forecasting of objects from image information. In some embodiments, IDFL may be defined as an interactive decision forest which uses cross-shared information about the different objects to differentiate them from each other.

Embodiments of the disclosure, as described above, may be advantageous in minimizing error and efficiently tracking objects from the field of view. As described above, in one implementation, the tracking system 200 uses information associated with other objects that are not the focus of the tracking system 200 in facilitating the tracking of the object of interest. This cross-association of information associated with similar objects leverages the differences between similar objects in distinguishing and ultimately identifying the bounding box with the object of interest. Without this cross-association or cross-sharing of information between similar objects, identifying an object amongst similar objects is very difficult since the objects have more features in common than not. For example, differentiating the index finger from the middle finger without any relative positioning information may be very difficult for traditional tracking systems.

In other embodiments, sharing of additional information such as spatial and temporal data may also improve tracking results. For instance, if index and middle fingers for the same hand are being tracked, positively identifying the index finger may rule out the possibility of including the finger identified as the index finger as a positive match for the middle finger being tracked.

Figure 4A:
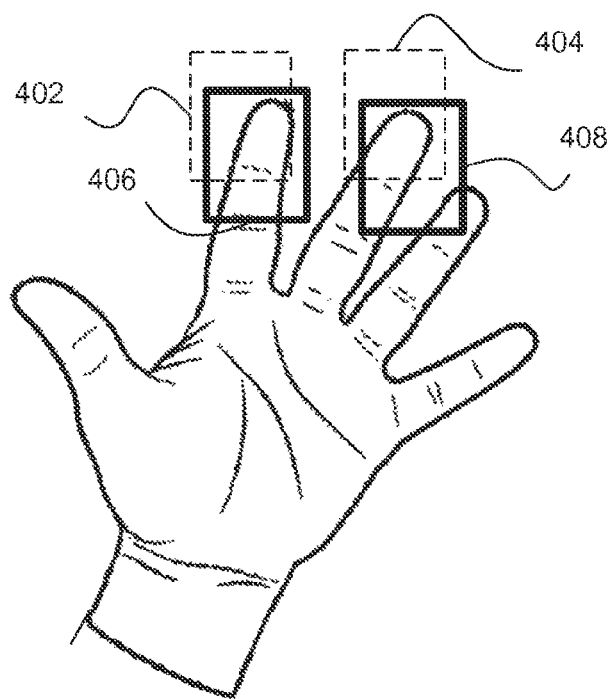
FIG. 4A and FIG. 4B provide an illustration for disambiguating similar objects according to at least one embodiment of the invention.
Figure 4B:
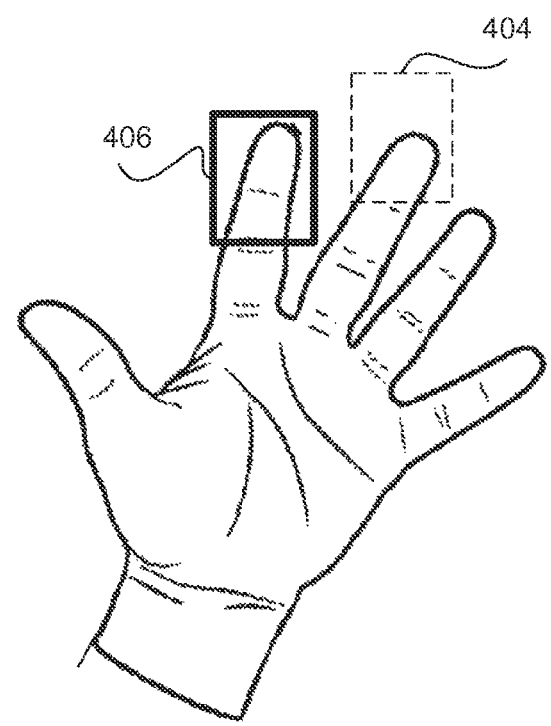

FIG. 4A and FIG. 4B provide an illustration for disambiguating similar objects by sharing spatial and temporal information, according to at least one embodiment of the invention. In FIG. 4A, the tracker is attempting to disambiguate two similar objects, namely the index and middle fingers. The index and middle finger may be both discovered as potential fingers.

The bold line bounding boxes (406 and 408) are the positive candidates associated with the index finger database and the dotted line bounding boxes (402 and 404) are the positive candidates associated with the middle finger. For illustration purposes, bounding box 406 may be probabilistically 70% similar to the index finger and bounding box 408 may be 75% similar to the index finger. Similarly bounding box 402 may be probabilistically 80% similar to the middle finger and bounding box 404 may be 90% similar to the middle finger.

In one implementation, since bounding box 404 has a 90% probability of being similar to the middle finger, which is the highest probability match amongst the bounding boxes, bounding box 404 may identify the middle finger. Even though bounding box 402 has an 80% probability associated with being middle finger, bounding box 402 cannot represent the middle finger, since the hand can have only one middle finger. Therefore, additional constraints may be applied to the system based on information shared for the tracking for the two fingers.

Furthermore, for detecting the index finger from bounding boxes 406 and 408, embodiments of the invention may consult spatial and temporal information from the tracking results for the middle finger, according to embodiments of the invention. For instance, even though, probabilistically bounding box 408 is 75% similar to the index finger, embodiments of the invention may still select bounding box 406 with a lower probability (i.e., 70%) as being the bounding box associated with the index finger, based on sharing information about the middle finger. Since bounding box 404 was already identified as representing the middle finger, a bounding box 408 that overlaps with bounding box 404 cannot possibly represent the index finger. Therefore, bounding box 406 is selected as representing the index finger based on sharing information for the other fingers and physical constraints based on the user hand. FIG. 4B illustrates the positive identification of the index finger (bounding box 406) and the middle finger (bounding box 404).

Figure 5A:
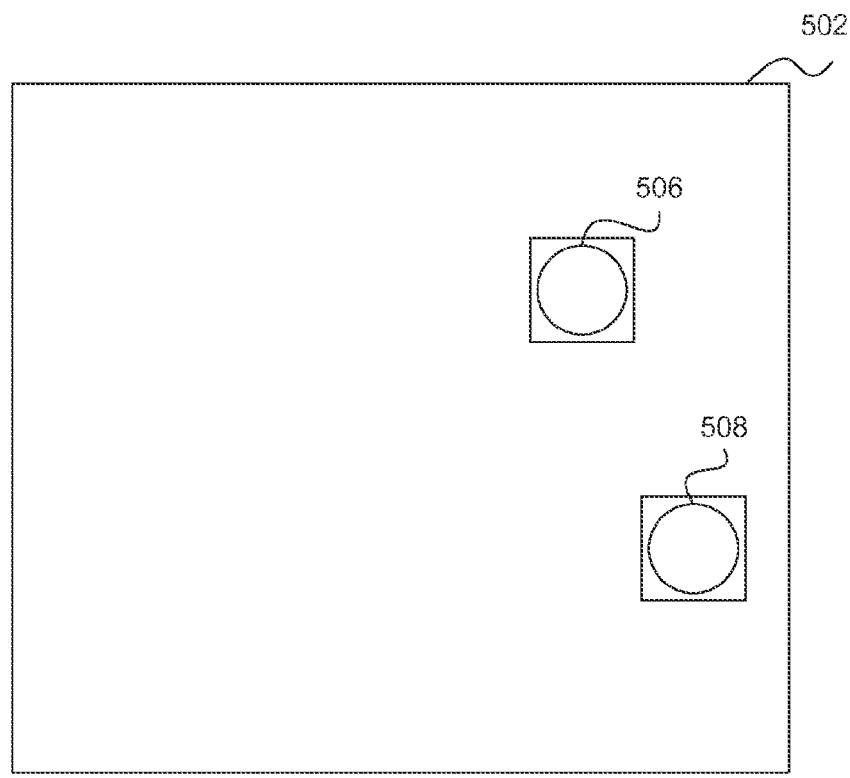
FIG. 5A illustrates an image frame at a first time with two identified objects.
Figure 5B:
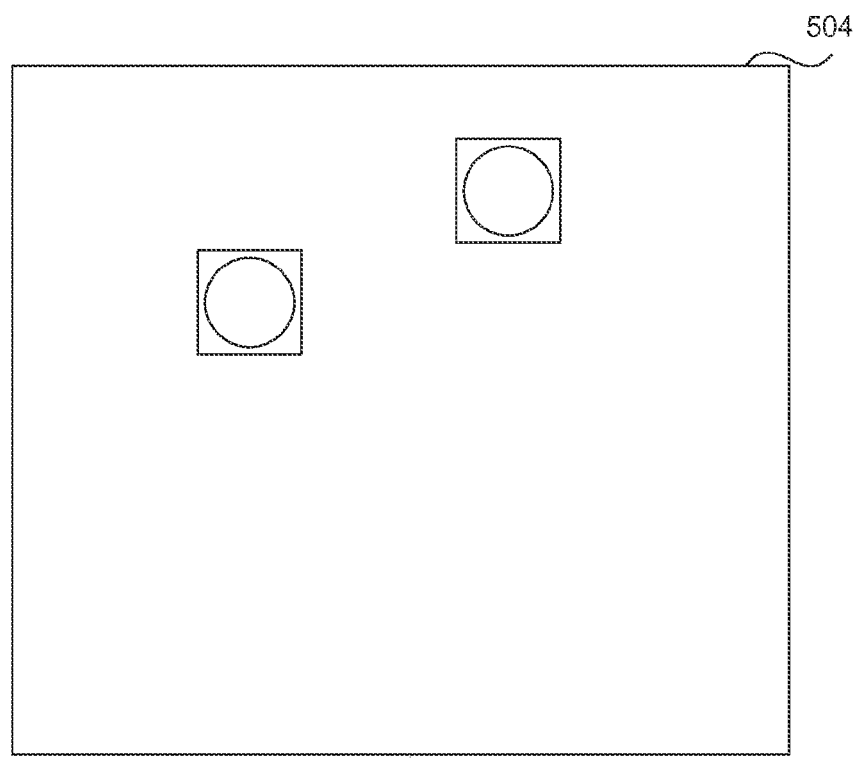
FIGS. 5B and 5C illustrate an image frame at a second time with respect to FIG. 5A with two objects.

FIG. 5A illustrates an image frame at a first time with two identified objects. FIG. 5A shows two similar balls being tracked (506 and 508) in an image frame at a first time (502). FIG. 5B illustrates an image frame at a second time (504) with the same two balls. However, since the balls are so similar it is difficult to differentiate balls based simply on their physical features.

Figure 5C:
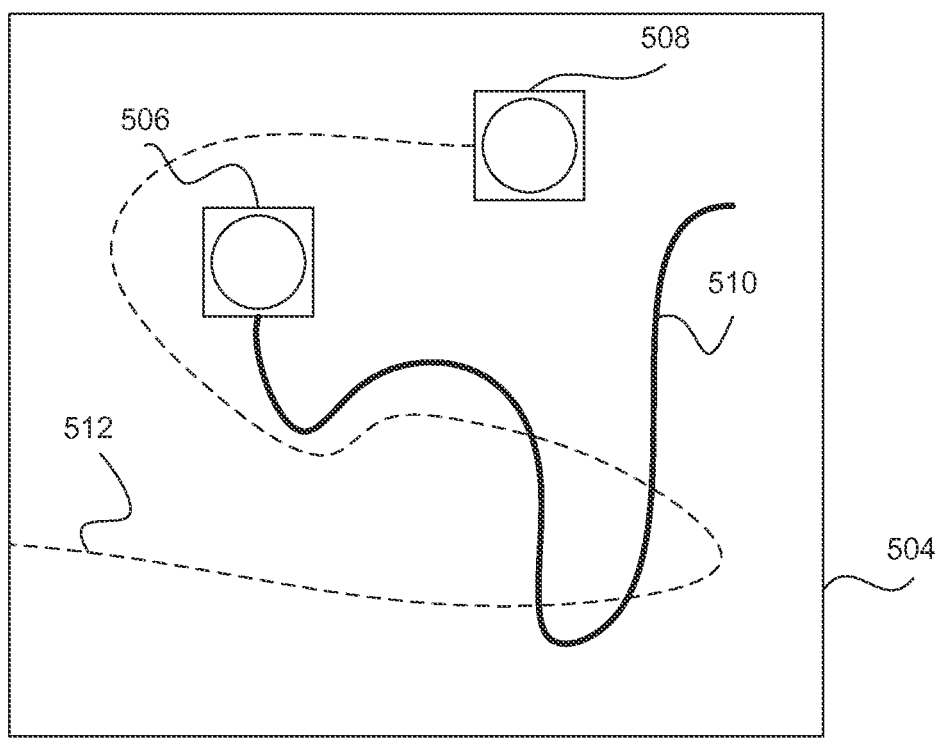

FIG. 5C illustrates identifying objects by sharing historical information regarding the path of movement of the objects at the second time (504). In one aspect of the invention, it may be advantageous to track trajectory information for the object, potentially as a feature, associated with the object for identifying the object and differentiating the objects from other objects. The solid bold line 510 shows the trajectory for the first object 506, and the dotted line 512 shows the trajectory for the second object 508. Using the projected trajectory, the objects identified in the first image frame at the first time (502) in FIG. 5A can be used in tracking and identifying the objects in the second frame at the second time (504).

Figure 6:
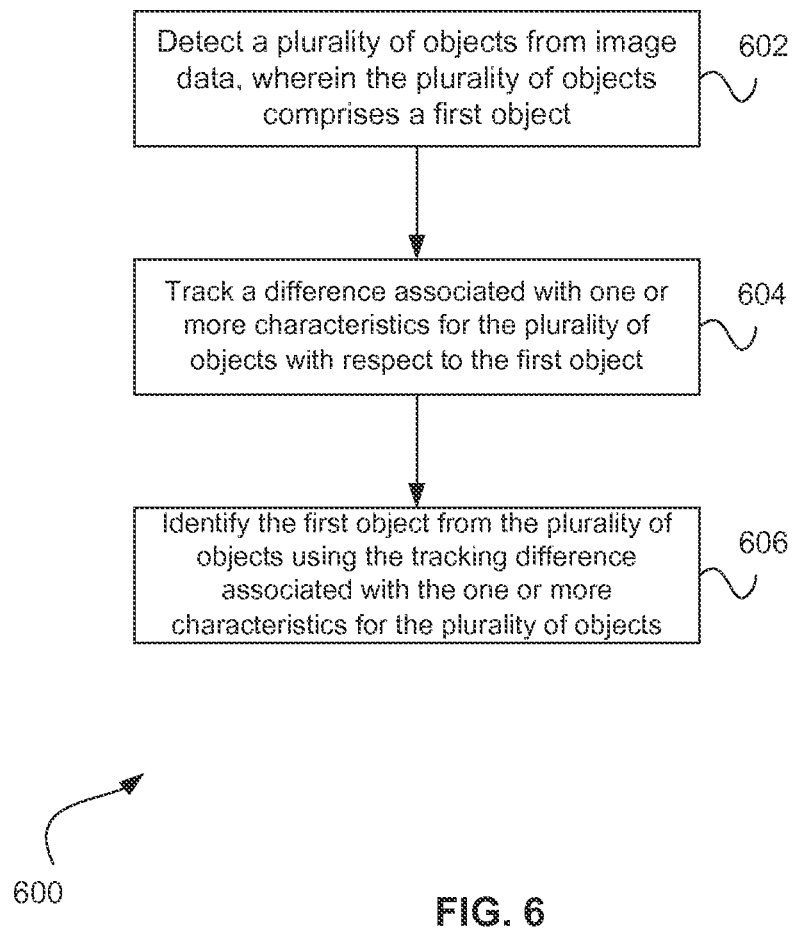
FIG. 6 is a flow diagram illustrating a method for performing an embodiment of the invention.

FIG. 6 is a flow diagram illustrating a method for performing an embodiment of the invention. The method 600 is performed by processing logic that comprises hardware (circuitry, dedicated logic, etc.), software (such as is run on a general purpose computing system or a dedicated machine), firmware (embedded software), or any combination thereof. In one embodiment, the method 600 is performed by a device 800 of FIG. 8.

At block 602, the tracking system 200 detects a plurality of objects from the image data, wherein the plurality of objects comprises a first object. One or more cameras 855 may be used in acquiring the image. In one implementation, detecting the plurality of objects may further comprise determining one of the objects from the plurality of objects as the object of interest. The plurality of objects may include objects that are substantially similar to each other. For example, the plurality of objects may comprise fingers of a user. In one example scenario, the tracking system 200, executing on the computing device 800 may track one finger (e.g., index finger) from the plurality of fingers of the user.

At block 604, the tracking system 200 tracks a difference associated with one or more features for the plurality of objects with respect to the first object from the image data. In one implementation, tracking the difference associated one or more features for the plurality of objects comprises dynamically learning and storing information about the differences of the one or more features associated with one or more of the plurality of objects. In one implementation, the dynamically learned information may be maintained in a database, such as an interactive dynamic decision forest learning (IDFL) database associated with each detected object.

In one aspect, tracking the difference associated with the one or more features may include identifying the one or more features for each object from the plurality of objects, and determining the difference associated with the one or more features between the object of interest and the remaining one or more objects. The one or more features for each object may be tracked using an instance of a tracker and wherein the difference associated with the one or more features between the first object and the remaining one or more objects is determined by sharing information between the instances of trackers associated with each object.

At block 606, the tracking system 200 may identify the object of interest from the plurality of objects using the tracking difference associated with the one or more features for the plurality of objects. In one aspect, identifying the first object from the plurality of objects may include weighing the differences associated with the one or more features amongst the plurality of objects higher than the similarities associated with the one or more features amongst the plurality of objects.

In one implementation, the object of interest may be labeled as a positive object and the remaining one or more objects may be labeled as negative objects. In one variation, differentiating the object of interest from at least one of the remaining one or more objects may include using the difference in the at least one feature associated with the positive object and the at least one of the remaining one or more objects labeled as negative objects in differentiating the first object from the at least one of the remaining one or more objects.

It should be appreciated that the specific steps illustrated in FIG. 6 provide a particular method of switching between modes of operation, according to one embodiment of the invention. Other sequences of steps may also be performed accordingly in alternative embodiments. For example, alternative embodiments may perform the steps outlined above in a different order. To illustrate, a user may choose to change from the third mode of operation to the first mode of operation, the fourth mode to the second mode, or any combination there between. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 600.

Figure 7:
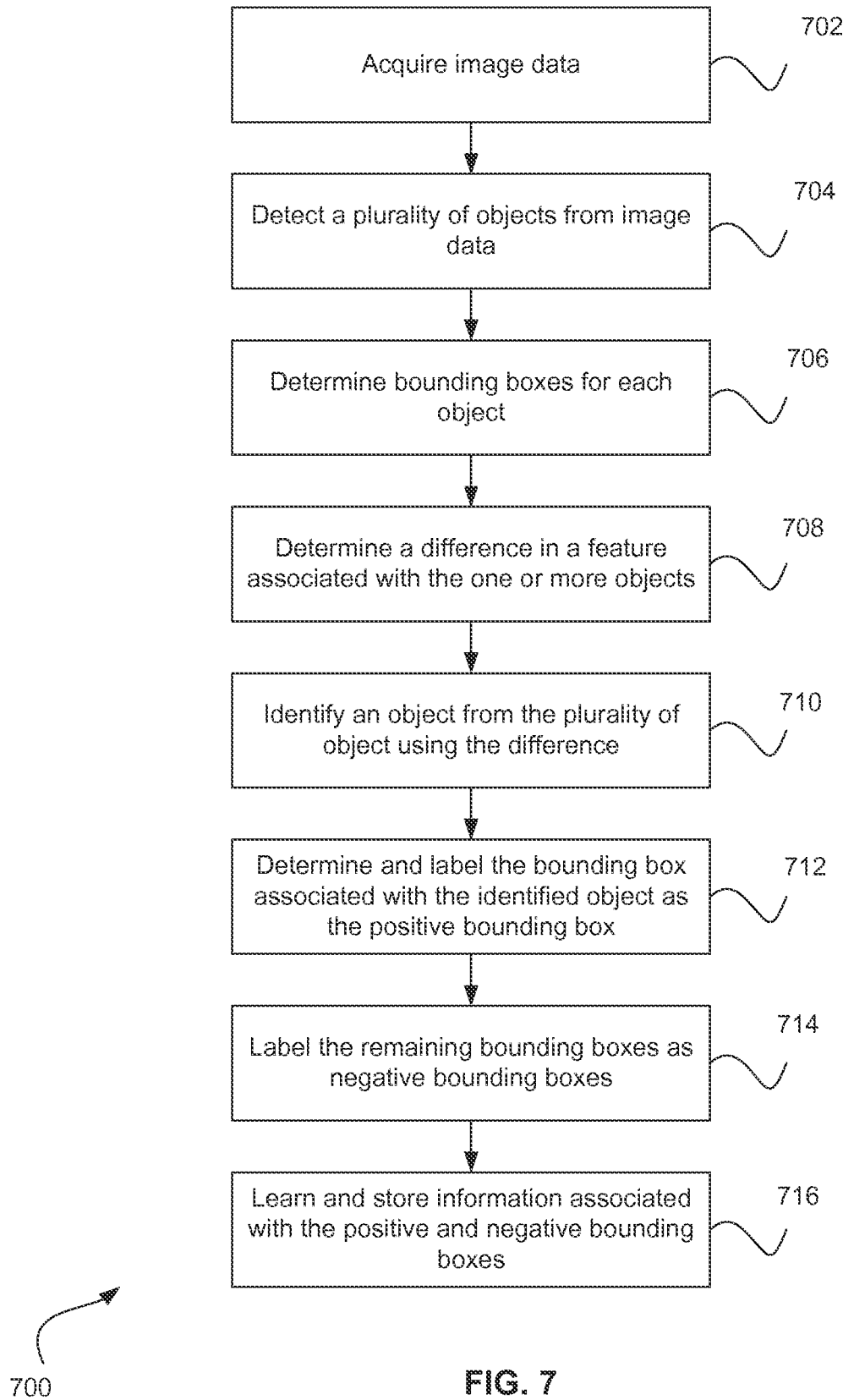
FIG. 7 is another flow diagram for illustrating a method for performing an embodiment of the disclosure.

FIG. 7 is another flow diagram for illustrating a method for performing an embodiment of the disclosure. The method 700 is performed by processing logic that comprises hardware (circuitry, dedicated logic, etc.), software (such as is run on a general purpose computing system or a dedicated machine), firmware (embedded software), or any combination thereof. In one embodiment, the method 700 is performed by a computing device 800 of FIG. 8.

At block 702, components of the computing device 800, such as one or more cameras 855 may acquire one or more images and temporarily store the image in memory 835. In one aspect, each image may represent the visible field of view of the camera 855 at the time the image was acquired.

At block 704, components of the computing device 800, such as the tracking system 200, may detect a plurality of objects from the image data. At block 706, components of the computing device 800, such as the tracking system 200 may determine a bounding box for each of the detected objects.

At block 708, components of the computing device 800, such as the Tracking Module 208 of the tracking system 200 may determine a difference in a feature associated with the one or more objects. The difference in a feature may be determined using information stored in the Positive and Negative databases in the Learning Module 210.

At block 710, the tracking system 200 may identify the object of interest from the plurality of objects using the difference. For example, in one example, the tracking system 200 may be configured to determine the difference between an index finger and a middle finger using the differences between the prominent lines from the fingerprints.

At block 712, the tracking system 200 may determine potential candidates and label the bounding box associated with the identified object of interest as the positive bounding box. At block 714, the tracking system 200 may label the remaining bounding boxes as negative bounding boxes. At block 716, the tracking system 200 may learn and store the information associated with the positive and negative bounding box from the image frame in the respective bounding box databases and enhance the positive and negative bounding box databases.

As discussed above, the positive and negative bounding box databases are continually and dynamically enhanced as the object is detected from frames of the images. As new images are acquired the tracking system 200 executing on the computing device 800, evaluates the features from the bounding boxes from the image frame using information from the dynamically enhanced databases.

It should be appreciated that the specific steps illustrated in FIG. 7 provide a particular method of switching between modes of operation, according to one embodiment. Other sequences of steps may also be performed accordingly in alternative embodiments. For example, alternative embodiments may perform the steps outlined above in a different order. To illustrate, a user may choose to change from the third mode of operation to the first mode of operation, the fourth mode to the second mode, or any combination there between. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 700.

FIG. 8 illustrates an exemplary computing device incorporating parts of the device employed in practicing embodiments of the invention. A computing device as illustrated in FIG. 8 may be incorporated as part of any computerized system, herein. For example, computing device can represent some of the components of a mobile device. A mobile device may be any computing system 800 with one or more input sensory unit or input devices 815 such as sensors 850 and one or more input/output devices such as a display unit or a touch screen. Examples of a computing device 800 include, but are not limited to, video game consoles, tablets, smart phones, laptops, netbooks, or other portable devices. FIG. 8 provides a schematic illustration of one embodiment of a computing device 800 that can perform the methods provided by various other embodiments, as described herein, and/or can function as the host computing device, a remote kiosk/terminal, a point-of-sale device, a mobile device, a set-top box and/or a computing device. FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computing device 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a camera, sensors 855 (including photo/light detectors), a mouse, a keyboard and/or the like; and one or more output devices 820, which can include without limitation a display unit, a printer and/or the like.

The computing device 800 may further include (and/or be in communication with) one or more non-transitory storage devices 825, which can comprise, without limitation, local and/or network accessible storage, and/or can include, without limitation, a disk drive, a drive array, an optical storage device, a solid-form storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computing device 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computing devices, and/or any other devices described herein. In many embodiments, the computing device 800 will further comprise a non-transitory working memory 835, which can include a RAM or ROM device, as described above.

The computing device 800 can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. In one implementation, components or modules of FIG. 3 and FIG. 4 may be performed using such software elements. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computing device, such as computing device 800. In other embodiments, the storage medium might be separate from a computing device (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computing device 800 and/or might take the form of source and/or installable code, which, upon compilation and/or installation on the computing device 800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 800 such as network input/output devices may be employed.

Some embodiments may employ a computing device (such as the computing device 800) to perform methods in accordance with the disclosure. For example, some or all of the procedures of the described methods may be performed by the computing device 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 800, various computer-readable media might be involved in providing instructions/code to processor(s) 810 for execution and/or might be used to store and/or carry such instructions/code (e.g. as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire and fiber optics, including the wires that comprise the bus 805, as well as the various components of the communications subsystem 830 (and/or the media by which the communications subsystem 830 provides communication with other devices). Hence, transmission media can also take the form of waves (including without limitation radio, acoustic and/or light waves, such as those generated during radio-wave and infrared data communications). In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for tracking an object, comprising:
   detecting a plurality of objects from image data, wherein the plurality of objects comprises a first object, and wherein the first object is identified using a first label for a positive tracking object and remaining objects of the plurality of objects are identified using a second label for negative tracking objects to indicate that the first object is to be the focus of tracking and that the remaining objects are not to be the focus of tracking, and to indicate that information associated with the first object is maintained in a dataset different than information associated with the remaining objects of the plurality of objects;
   tracking a difference associated with one or more features for the plurality of objects with respect to the first object from the image data, wherein tracking the difference associated with the one or more features for the plurality of objects comprises dynamically learning and storing information about the difference of the one or more features associated with one or more of the plurality of objects, and wherein the dynamically learned information is maintained in an IDFL (Interactive Decision Forest Learning) dataset for each detected object; and
   identifying the first object from the plurality of objects using the tracking difference associated with the one or more features for the plurality of objects.

2. The method of claim 1, wherein identifying the first object from the plurality of objects comprises weighing the difference associated with the one or more features amongst the plurality of objects higher than similarities associated with the one or more features amongst the plurality of objects.

3. The method of claim 1, wherein tracking the difference associated with the one or more features comprises:
   identifying the one or more features for each object from the plurality of objects; and
   determining the difference associated with the one or more features between the first object and the remaining one or more objects.

4. The method of claim 3, wherein the one or more features for each object are tracked using an instance of a tracker and wherein the difference associated with the one or more features between the first object and the remaining one or more objects is determined by sharing information between the instances of trackers associated with each object.

5. The method of claim 1, wherein the plurality of objects are fingers.

6. The method of claim 1, wherein differentiating the first object from at least one of the remaining one or more objects comprises using the difference in an at least one feature from the one or more features associated with the positive tracking object and the at least one of the remaining one or more objects labeled as negative tracking objects in differentiating the first object from the at least one of the remaining one or more objects.

7. The method of claim 1, wherein the plurality of objects are substantially similar to each other.

8. The method of claim 1, wherein detecting the plurality of objects further comprises determining the first object from the plurality of objects.

9. The method of claim 1, further comprising identifying the first object using trajectory information associated with a movement of the first object.

10. The method of claim 9, further comprising identifying the first object using the difference between the trajectory information associated with the movement of the first object and at least one of the remaining one or more objects.

11. The method of claim 1, further comprising identifying the first object based on physical constraints on a movement of the first object.

12. A computing device, comprising:
    a camera coupled to the computing device for acquiring an image;
    a processor configured to:
       detect a plurality of objects from image data from the image, wherein the plurality of objects comprises a first object, and wherein the first object is identified using a first label for a positive tracking object and remaining objects of the plurality of objects are identified using a second label for negative tracking objects to indicate that the first object is to be the focus of tracking and that the remaining objects are not to be the focus of tracking, and to indicate that information associated with the first object is maintained in a dataset different than information associated with the remaining objects of the plurality of objects; and
    a tracking module executing on the processor configured to:
       track a difference associated with one or more features for the plurality of objects with respect to the first object from the image data; and
       identify the first object from the plurality of objects using the tracking difference associated with the one or more features for the plurality of objects.

13. The computing device of claim 12, wherein tracking the difference associated with the one or more features, by the tracking module, for the plurality of objects comprises dynamically learning and storing information about the difference of the one or more features associated with one or more of the plurality of objects.

14. The computing device of claim 13, wherein the dynamically learned information is maintained by the computing device in a dynamic decision forest learning dataset associated with each detected object.

15. The computing device of claim 12, wherein identifying the first object from the plurality of objects, by the tracking module of the computing device, comprises weighing the difference associated with the one or more features amongst the plurality of objects higher than similarities associated with the one or more features amongst the plurality of objects.

16. The computing device of claim 12, wherein tracking the difference associated with the one or more features comprises:
   identifying, by the tracking module, the one or more features for each object from the plurality of objects; and
   determining, by the tracking module, the difference associated with the one or more features between the first object and the remaining one or more objects.

17. The computing device of claim 16, wherein the one or more features for each object are tracked, by the computing device, using an instance of a tracker and wherein the difference associated with the one or more features between the first object and the remaining one or more objects is determined by sharing information between the instances of trackers associated with each object.

18. The computing device of claim 12, wherein the plurality of objects are fingers.

19. The computing device of claim 12, wherein differentiating the first object from at least one of the remaining one or more objects comprises using the difference in an at least one feature from the one or more features associated with the positive tracking object and the at least one of the remaining one or more objects labeled as negative tracking objects in differentiating the first object from the at least one of the remaining one or more objects.

20. The computing device of claim 12, wherein the plurality of objects are substantially similar to each other.

21. The computing device of claim 12, wherein detecting the plurality of objects further comprises determining the first object from the plurality of objects.

22. The computing device of claim 12, further comprising identifying the first object using trajectory information associated with a movement of the first object.

23. The computing device of claim 22, further comprising identifying the first object using the difference between the trajectory information associated with the movement of the first object and at least one of the remaining one or more objects.

24. The computing device of claim 12, further comprising identifying the first object based on physical constraints on a movement of the first object.

25. A non-transitory computer readable storage medium, wherein the non-transitory computer readable storage medium comprises instructions executable by a processor, the instructions comprising instructions to:
   detect a plurality of objects from image data, wherein the plurality of objects comprises a first object, and wherein the first object is identified using a first label for a positive tracking object and remaining objects of the plurality of objects are identified using a second label for negative tracking objects to indicate that the first object is to be the focus of tracking and that the remaining objects are not to be the focus of tracking, and to indicate that information associated with the first object is maintained in a dataset different than information associated with the remaining objects of the plurality of objects;
   track a difference associated with one or more features for the plurality of objects with respect to the first object from the image data; and
   identify the first object from the plurality of objects using the tracking difference associated with the one or more features for the plurality of objects.

26. The non-transitory computer readable storage medium of claim 25, wherein tracking the difference associated with the one or more features for the plurality of objects comprises dynamically learning and storing information about the difference of the one or more features associated with one or more of the plurality of objects.

27. The non-transitory computer readable storage medium of claim 25, wherein identifying the first object from the plurality of objects comprises weighing the difference associated with the one or more features amongst the plurality of objects higher than similarities associated with the one or more features amongst the plurality of objects.

28. The non-transitory computer readable storage medium of claim 25, wherein tracking the difference associated with the one or more features comprises instructions to:
   identify the one or more features for each object from the plurality of objects; and
   determine the difference associated with the one or more features between the first object and the remaining one or more objects.

29. The non-transitory computer readable storage medium of claim 28, wherein the one or more features for each object are tracked using an instance of a tracker and wherein the difference associated with the one or more features between the first object and the remaining one or more objects is determined by sharing information between the instances of trackers associated with each object.

30. The non-transitory computer readable storage medium of claim 25, wherein the plurality of objects are fingers.

31. The non-transitory computer readable storage medium of claim 25, wherein the plurality of objects are substantially similar to each other.

32. An apparatus, comprising:
   means for detecting a plurality of objects from image data, wherein the plurality of objects comprises a first object, and wherein the first object is identified using a first label for a positive tracking object and remaining objects of the plurality of objects are identified using a second label for negative tracking objects to indicate that the first object is to be the focus of tracking and that the remaining objects are not to be the focus of tracking, and to indicate that information associated with the first object is maintained in a dataset different than information associated with the remaining objects of the plurality of objects;
   means for tracking a difference associated with one or more features for the plurality of objects with respect to the first object from the image data; and
   means for identifying the first object from the plurality of objects using the tracking difference associated with the one or more features for the plurality of objects.

33. The apparatus of claim 32, wherein tracking the difference associated with the one or more features for the plurality of objects comprises means for dynamically learning and storing information about the difference of the one or more features associated with the one or more of the plurality of objects.

34. The apparatus of claim 32, wherein identifying the first object from the plurality of objects comprises means for weighing the difference associated with the one or more features amongst the plurality of objects higher than similarities associated with the one or more features amongst the plurality of objects.

35. The apparatus of claim 32, wherein tracking the difference associated with the one or more features comprises instructions to:
- means for identifying the one or more features for each object from the plurality of objects; and
- means for determining the difference associated with the one or more features between the first object and the remaining one or more objects.

36. The apparatus of claim 35, wherein the one or more features for each object are tracked using an instance of a tracker and wherein the difference associated with the one or more features between the first object and the remaining one or more objects is determined by sharing information between the instances of trackers associated with each object.

37. The apparatus of claim 32, wherein the plurality of objects are fingers.

38. The apparatus of claim 32, wherein the plurality of objects are substantially similar to each other.

\* \* \* \* \*